(12) United States Patent
Matsuda (10) Patent No.: US 9,010,476 B2
(45) Date of Patent: Apr. 21, 2015

(54) SADDLE-TYPE ELECTRIC VEHICLE (75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 13/882,981

(22) PCT Filed: Nov. 5, 2010

(86) PCT No.: PCT/JP2010/006517
§ 371 (c)(1),
(2), (4) Date: May 17, 2013

(87) PCT Pub. No.: WO2012/059959
PCT Pub. Date: May 10, 2012

(65) Prior Publication Data
US 2013/0220721 A1 Aug. 29, 2013

(51) Int. Cl.
*B62K 11/00* (2006.01)
*B62K 11/04* (2006.01)
*B62K 19/32* (2006.01)
*B62K 25/28* (2006.01)
*B60K 1/04* (2006.01)

(52) U.S. Cl.
CPC . *B62K 11/04* (2013.01); *B60K 1/04* (2013.01); *B62K 19/32* (2013.01); *B62K 25/283* (2013.01); *B62K 2204/00* (2013.01)

(58) Field of Classification Search
CPC .......... B60K 1/00; B60K 1/04; B60K 7/0007; B62K 11/00; B62K 11/04
USPC ................................. 180/220, 65.1
See application file for complete search history.

(56) References Cited

U.S. PATENT DOCUMENTS

| 3,773,131 | A | * | 11/1973 | Jaulmes | 180/206.5 |
| 5,501,292 | A | * | 3/1996 | Kawashima et al. | 180/220 |
| 5,758,736 | A | * | 6/1998 | Yamauchi | 180/220 |
| 7,210,550 | B2 | * | 5/2007 | Yonehana et al. | 180/220 |

(Continued)

FOREIGN PATENT DOCUMENTS

| JP | 63156890 U | 10/1988 |
| JP | 04090979 A | 3/1992 |
| JP | 11278359 A | 10/1999 |
| JP | 2000038184 A | 2/2000 |
| JP | 2002252955 A | 9/2002 |

(Continued)

OTHER PUBLICATIONS

ISA Japan, International Search Report of PCT/JP2010/006517, Jan. 31, 2011, WIPO, 4 pages.

*Primary Examiner* — Kevin Hurley
*Assistant Examiner* — Michael Stabley
(74) *Attorney, Agent, or Firm* — Alleman Hall McCoy Russell & Tuttle LLP (57) ABSTRACT

In a saddle-type electric vehicle like an electric two-wheeled vehicle, a shaft center of a motor shaft of a traveling motor in a power plant installed between a front wheel and a rear wheel is installed lower than a shaft center of a rearward output shaft, and the whole power plant is installed as low as possible in a state where a front part is at a lower position. Batteries are installed diagonally forward from above the power plant, a gravity center of the batteries and a gravity center of the power plant are arranged to correspond to a roll axis line having the front part which is high. Thus, while the height of the gravity centers approximate the roll axis line of the vehicle body, a composite gravity center of the both is properly set, and balance of handling and motion performance can be improved.

16 Claims, 7 Drawing Sheets

(56) References Cited

U.S. PATENT DOCUMENTS

| | | | |
|---|---|---|---|
| 7,270,210 B2* | 9/2007 | Katsura | 180/219 |
| 7,971,673 B2* | 7/2011 | Sasage et al. | 180/220 |
| 8,376,075 B2* | 2/2013 | Sasage et al. | 180/68.5 |
| 2010/0018787 A1* | 1/2010 | Plazotta et al. | 180/65.6 |
| 2010/0078247 A1* | 4/2010 | Sasage et al. | 180/220 |

FOREIGN PATENT DOCUMENTS

| | | |
|---|---|---|
| JP | 2003182669 A | 7/2003 |
| JP | 2003267283 A | 9/2003 |
| JP | 2010018270 A | 1/2010 |
| JP | 2010083333 A | 4/2010 |
| JP | 2012096594 A | 5/2012 |

* cited by examiner

SADDLE-TYPE ELECTRIC VEHICLE

TECHNICAL FIELD

The present invention relates to a saddle-type electric vehicle including an electric two-wheeled vehicle or an ATV (All Terrain Vehicle) employing an electric motor as a drive source, and a hybrid vehicle installed with an engine, and particularly to layout of an electric motor or an electric storage device.

BACKGROUND ART

Recently, also from a standpoint of future depletion of oil resources as increasing environmental awareness, reduction of fuel consumption of cars, motorcycles, etc. is more strongly demanded than ever before. On the other hand, secondary batteries represented by lithium-ion batteries have significantly advanced, attempt of enabling electroactuation of driving power like electric cars or hybrid cars has been increasing.

However, the energy density of the secondary batteries is still infinitely smaller than one of petroleum fuel such as gasoline, and a plurality of batteries must be installed to ensure a travel distance satisfying practical use. In this regard, saddle-type vehicles such as motorcycles have originally small spaces, and ingenuity for installing a plurality of batteries in a vehicle body is required.

For example, in a scooter-type electric two-wheeled vehicle described in Patent Document 1, a large battery box is disposed to be surrounded by a main frame, a down frame, and a pivot frame of a vehicle body, and many battery cells are aligned within the box to correspond to a box's shape. Since output of the scooter-type electric two-wheeled vehicle is generally low, and just needs a small electric motor, an in-wheel electric motor integrally provided with an axle of a rear wheel is employed.

On the other hand, since a sporty electric two-wheeled vehicle is installed with a relatively large motor with high output, for example, the electric motor is often installed, in front of a pivot frame, namely at a position where an engine is conventionally installed as described in Patent Document 2. In the vehicle in this document, rotation of a motor shaft is reduced in speed by gears, and torque is increased, and transmitted to a rear wheel through a chain from an output shaft located behind the motor shaft.

Figure 2:
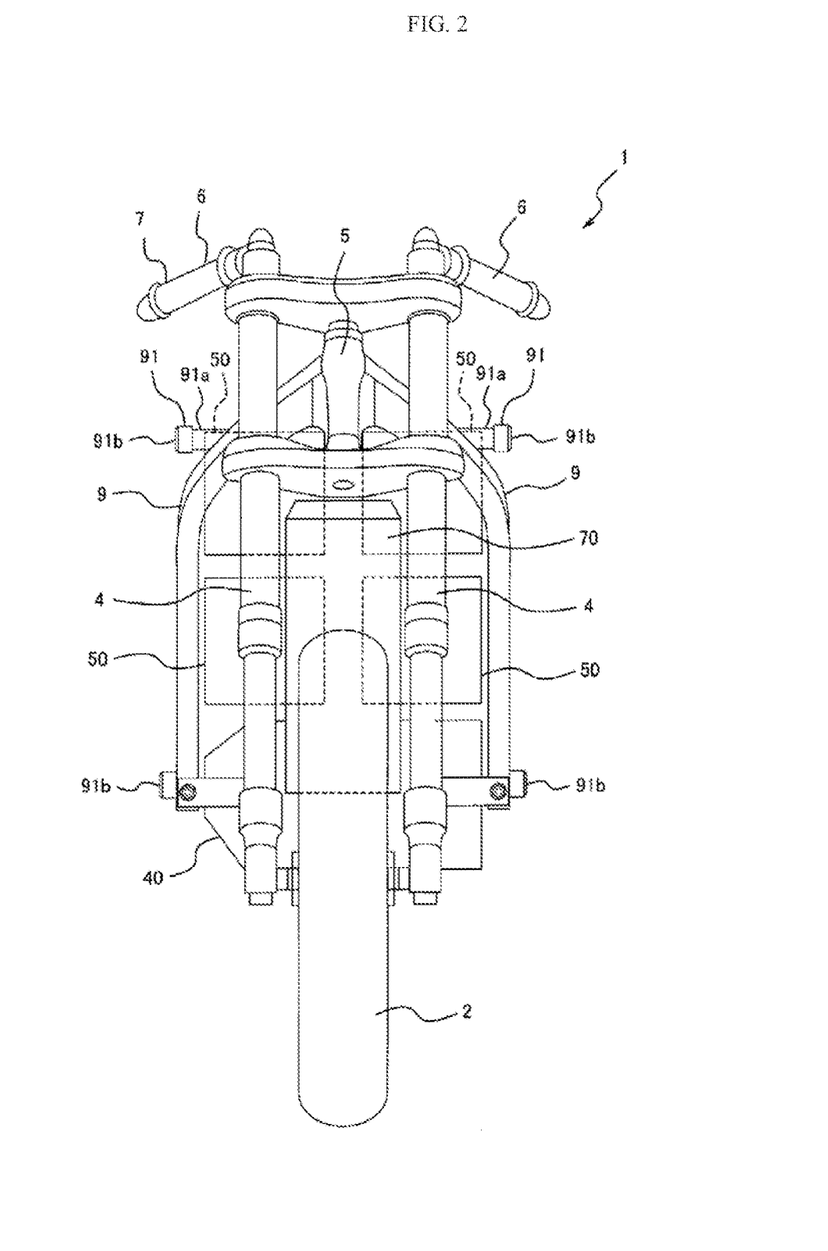
FIG. 2 is a front view as viewing the electric two-wheeled vehicle from front.

In order to supply a large current to the large electric motor with high output, in the electric two-wheeled vehicle described in this document, a large energy reservoir is arranged adjacent to an upper portion of the electric motor as shown in FIG. 2. This energy reservoir is an electric storage device storing many batteries in a housing, and is located on a rear side from directly above the electric motor according to FIG. 2.

PRIOR ART DOCUMENTS

Patent Documents

Patent Document 1: Japanese Patent Application Laid-open No. 2010-83333
Patent Document 2: Japanese Patent Application Laid-open No. 2010-018270

SUMMARY OF THE INVENTION

Problems to be Solved by the Invention

Generally, in vehicles having tilting vehicle bodies like two-wheeled vehicles, while handling is not easy when a center of gravity position is high, light feeling during cornering becomes impaired when the gravity center position is too low. That is, since the two-wheeled vehicle tilts while cornering, an active cornering center line (roll axis line) of the vehicle body does not become horizontal but is defined to direct forward obliquely upward from a grounding point of the rear wheel, and thus the further apart the gravity center position from this roll axis line is, the larger moment during cornering is.

In this regard, in the scooter-type electric two-wheeled vehicle like the former conventional example (Patent Document 1), since installation positions of the heavy batteries are low, handling is easy, but motion performance is not high. On the other hand, in the latter conventional example (Patent Document 2), since the heavy electric storage device is installed above the electric motor, a gravity center position is too high, and handling may become difficult.

As shown in FIG. 2, etc. of Patent Document 2, a gravity center position of the electric storage device located at a relatively high position is more rearward than the electric motor located at a relatively low position. Since the electric storage device and the electric motor are arranged, as it were, to direct rearward while inclining upward there is still room for the respective gravity center positions to approximate the aforementioned roll axis line directing forward while inclining upward.

In order to solve the problems, an object of the present invention is to exercise ingenuity for layout of the heavy electric motor and electric storage device, and improve balance of excellent handling and motion performance by properly lowering the composite gravity center of the both while the respective gravity center positions approximate the roll axis line.

Solutions to the Problems

The present invention is directed to a saddle-type electric vehicle installed with a traveling electric motor between a front wheel and a rear wheel, and driving the rear wheel through a power transmission mechanism. The power transmission mechanism comprises an output shaft arranged more rearward of a vehicle body than a motor shaft of the electric motor and parallel to the motor shaft, receiving rotation transmitted from the motor shaft, and transmitting the rotation to the rear Wheel through a transmission member extending rearward, and a shaft center of the motor shaft is located at a lower position than a shaft center of the output shaft.

That is, generally, in the saddle-type vehicle like a two-wheeled vehicle, a height of the output shaft of the power transmission mechanism is substantially determined from demand of a vehicle body side. For example, when a chain or a belt (endless transmission member) is wound around a sprocket or a pulley of the output shaft, and driving force is transmitted to the rear wheel, the height of the output shaft must be substantially the same as for slightly higher than) a pivot shaft supporting a front end of a swing arm. The shaft center of the electric motor on a driving side is generally substantially the same as the output shaft.

The shaft center of the electric motor is made lower than the output shaft, namely, the installation position of the electric motor in the vehicle body is made as low as possible, thereby easily ensuring an arrangement space of the electric storage devices above the electric motor. Moreover, in the power plant configured from the electric motor and the power transmission mechanism, the position of the electric motor located relatively forward becomes low, and therefore the electric storage devices can be installed diagonally forward from above this power plant, and the gravity center of the electric storage devices at relatively high position are located more forward than the gravity center of the power plant at a relatively low position.

That is in the vehicle having the vehicle body tilting during cornering like the two-wheeled vehicle, the gravity center positions of the two heavy components are aligned in a state where the front is higher than the rear, corresponding to the roll axis line tilting to direct forward while inclining upward, and these gravity center positions can be further approximate the roll axis line.

Specifically, in the vehicle having the body frame including a head pipe supporting a steering shaft, the roll axis line is substantially defined to be in a roll axis area between boundaries extending from a grounding point of the rear wheel to upper and lower ends of the head pipe, respectively, in side view of the vehicle body. While the gravity center of the electric storage devices may be located in this roll axis area, the gravity center of the power plant may be below the lower boundary of the roll axis area. Consequently, the composite gravity center of the power plant and the electric storage device is located at a suitable height which is slightly below the roll axis line.

When the rear wheel is pivotally supported on a rear end of a swing arm, and a front end of the swing arm is vertically swingably supported in a pivot support portion of the body frame, the power plant may be supported adjacent to a front side of the pivot support portion. Also by this, the gravity center position of the power plant approximates the roll axis line.

As the power transmission mechanism, a gear-type transmission may be employed that comprises an input shaft arranged more rearward of the vehicle body than the motor shaft of the electric motor, forward of the vehicle body than the output shaft, and parallel to both the shafts, and receiving rotation transmitted from the motor shaft, and that changes speed of the rotation from the motor shaft transmitted to the input shaft with gear trains provided on the input shaft and the output shaft respectively to transmit the rotation to the output shaft.

Such a gear-type transmission can obtain a compact configuration by reducing an interval between the input shaft and the output shaft. Furthermore, the driven gear on the input shaft, meshing with the drive gear on the motor shaft partially overlap the electric motor in side view of the vehicle body, and the input shaft approximates the motor shaft as close as possible. Such layout also reduces an interval between the transmission and the electric motor. Thus, by downsizing of the whole power plant, the position of the electronic motor at the relatively forward in the power plant approximates the rearward pivot support portion. Also by this, the gravity center position of the power plant approximates the roll axis line.

Furthermore, in a case of the two-wheeled vehicle, impact applied to the electric storage devices need to be reduced when the vehicle overturns. When the body frame includes a main frame portions extending rearward from the head pipe, and a pair of right and left down frame portions extending downward from a front end of the main frame portion, at least lower parts of the right and left down frame portions may be located outside the electric storage devices in a vehicle width direction.

By this, the electric storage devices are unlikely to directly receive impact from a road surface when the vehicle overturns. When respective projecting portions are provided on upper parts of the right and left down frame portions to project outside the electric storage devices in a vehicle width direction, the impact from the road surface is further unlikely to be applied. Torsional rigidity of the body frame can be integrally secured by the central main frame portion and the pair of right and left down frame portions.

The main frame portion itself may be configured from a frame member divided into right and left parts, and the electric storage devices may be installed to be surrounded by the main frame. Also in this case, the impact applied to the electric storage device when the vehicle overturns can be reduced, Effects of the Invention In the saddle-type electric vehicle according to the present invention, the power plant configured from the electric motor and the power transmission mechanism is installed as low as possible around a center of the vehicle body in a state where the front part is at a lower position, thereby enabling the electric storage devices to be installed diagonally forward from above the power plant, and enabling the respective gravity center positions of the heavy electric motor and the electric storage device to approximate the roll axis line directing frontward while inclining upward while the composite gravity center of the both sets at a proper height. Accordingly, balance of handling and motion performance of the vehicle can be more improved than ever before.

EMBODIMENTS OF THE INVENTION

Hereinafter, embodiments of the electric two-wheeled vehicle according to the present invention will be described with reference to the drawings. A concept of a direction used in the following description is based on a direction viewed from a driver riding the electric two-wheeled vehicle.

First Embodiment

Figure 1:
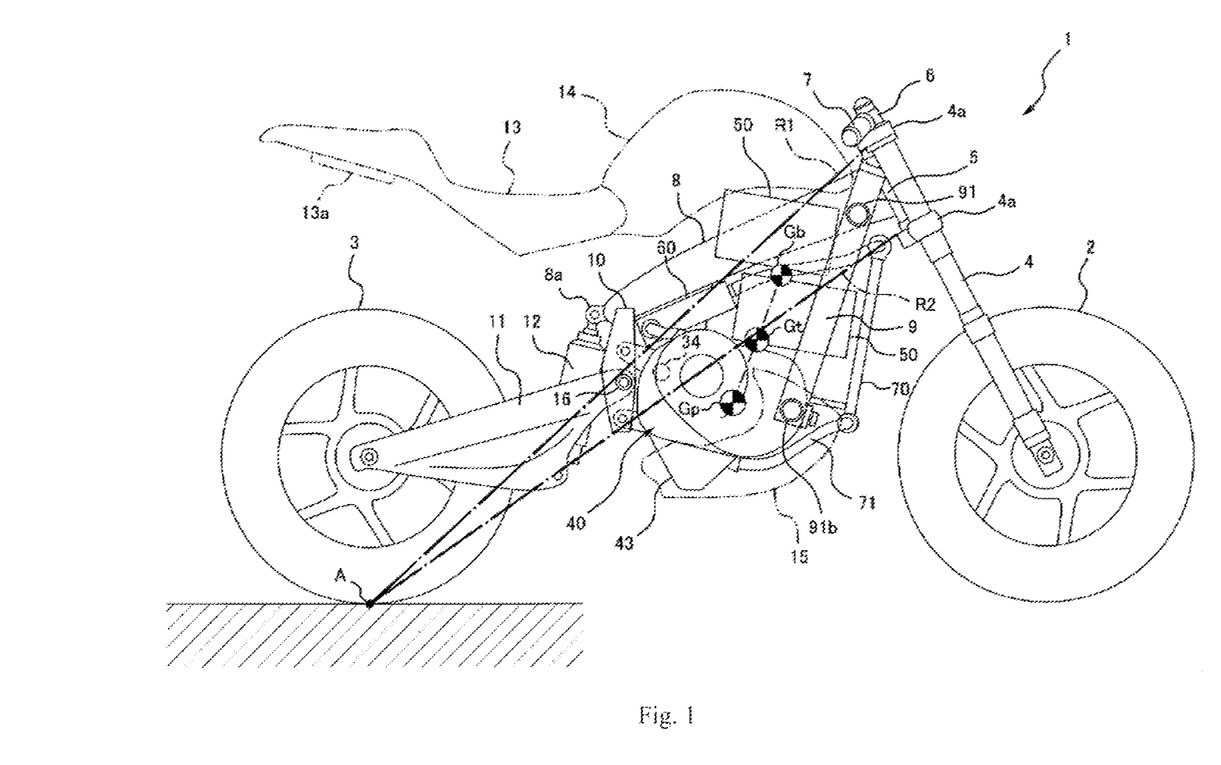
FIG. 1 is a right side view showing a main part of an electric two-wheeled vehicle according to a first embodiment of the present invention, and shows layout of a power plant or an electric storage device in relationship with a roll shaft center.

FIG. 1 is a right side view mainly showing main parts such as a body frame, a power plant, and wheels of an electric two-wheeled vehicle 1 (electric vehicle) according to a first embodiment of the present invention, and FIG. 2 is a front view as viewed from front. As shown in FIG. 1, an electric two-wheeled vehicle 1 includes a front wheel 2 as a steering wheel, and a rear wheel 3 as a drive wheel. The front wheel 2 is rotatably supported by lower ends of a pair of right and left front forks 4 extending substantially vertically, while upper portions of the front forks 4 are supported by a steering shaft (not shown) through a pair of upper and lower brackets 4a.

The steering shaft is rotatably supported in a state of being inserted in a head pipe 5 on a vehicle body side, and configures a steering axle. That is, the upper bracket 4a is mounted with a bar-shaped handles 6 extending to right and left, and allows a driver can steer the front forks 4 and the front wheel 2 about the steering shaft by these handles 6. An accelerator grip 7 is disposed on a right end of the handle 6 to be gripped by a right hand of the driver and rotated by twist of a wrist.

The body frame of the electric two-wheeled vehicle 1 includes a single main frame 8 extending rearward from the aforementioned head pipe 5 while slightly inclining downward, as an example. For example, this is made from an angular sectioned pipe member of an aluminum alloy extrudate, and has a front end welded on the head pipe 5. Upper ends of a pair of right and left down frames 9 extending downward are also welded adjacent to this welding area, and these down frames 9 extend downward from the head pipe 5 and incline so as to expand to right and left at a interval with a prescribed value, and further extend downward while keeping the interval, as shown in FIG. 2.

On the other hand, an upper frame portion of a pivot frame 10 formed into a rectangular frame-shape as an example (pivot support portion of the body frame) is welded on a rear end of the main frame 8 so as to extend to right and left substantially orthogonal to the rear end of the main frame 8. A rear portion of a case member of a power plant 40 later described in detail is fastened to the pivot frame 10, and a front portion of this case member is fastened to lower ends of the aforementioned down frames 9. That is, in the present embodiment, the body frame is integrally configured by the main frame 8, the down frames 9, pivot frame 10, and the case member of the power plant 40, and high torsional rigidity is secured.

A front end of a swing arm 11 supporting the rear wheel 3 is supported in a vertically swingable manner between left and right frame portions of the aforementioned pivot frame 10, and the swing arm 11 extends rearward from the swing pivot shaft 16 (pivot shaft) while slightly inclining downward. In an example of the drawing, a rear side of the swing arm 11 is forked, and rotatably supports the rear wheel 3 therebetween. On the other hand, a downward swelling portion is formed on a front side of the swing arm 11, and supports a lower end of a suspension unit 12. An extending portion 8a on a rear end of the main frame 8 supports an upper end of the suspension unit 12, and the suspension unit 12 expands and shrinks with vertical swing of the swing arm 11.

In the drawing, as shown by a virtual line, a sheet 13 for riding is disposed above the swing arm 11, a tandem grips 13a grasped by a passenger riding at rear of the sheet is provided along both right and left edges of the sheet. These are supported by a rear frame (not shown) connected to the main frame 8. A dummy tank 14 is provided in front of the sheet to be held between both knees of the driver. Furthermore, a resin under guard 15 is disposed below a resin power plant 40.

The power plant 40 including a traveling motor 20 and a transmission 30 (see FIG. 3), batteries 50 (electric storage devices) and a power control unit 60 for supplying power to the traveling motor 20 are disposed in a space between the front wheel 2 and the rear wheel 3, where an engine, a transmission, a throttle device, and the like are arranged in a conventional motorcycle. The traveling motor 20 is a motor generator enabling motor operation and power generation, and performs motor operation upon receipt of power supply while operating as a generator in regenerative braking. A generated alternating current is converted into a direct current by an inverter of the power control unit 60 to charge the batteries 50.

In the example of the drawing, the power plant 40 is located at a substantial center of front and rear wheels 2, 3, and the four batteries 50 are installed forward from above the power plant. As an example of the four batteries 50, pairs of the batteries are disposed on right and left around the main frame 8. The lower batteries 50, namely the two closer to the power plant 40 among the four batteries 50, have lower ends located in front of an output shaft 34 (shown by a broken line in FIG. 1) of the power plant 40 and adjacent above the power plant 40. As shown in FIG. 2, as viewed from front of the vehicle body, at least lower portions of the pair of the right and left down frames 9 are located outside the right and left batteries 50 in a vehicle width direction. Therefore, impact from a road surface is not directly applied to the lower portion of the batteries 50 even when the electric two-wheeled vehicle 1 overturns.

On the other hand, upper portions of the down frames 9 incline downward from the head pipe 5 to expand to right and left as described above, and upper edges of the batteries 50 are located outside the down frames 9 in the vehicle width direction in the middle of inclining portions. However, in the example of the drawing, projecting portions 91 are provided on the down frames 9 to project outward in the vehicle width direction at substantially the same heights of the batteries 50 located outside in the vehicle width direction. These are falling sliders mounted with resin buffers 91b on tips of the metal pipe members 91a as shown in FIG. 2, and make it difficult to apply impact from a road surface also to upper portions of the batteries 50 when overturning.

The aforementioned projecting portions 91 can preferably support a vehicle weight of the electric two-wheeled vehicle 1 in order to prevent the batteries 50 and the road surface from coming into contact in a state where the electric two-wheeled vehicle 1 has fallen. While the down frames 9 protect lower portions of the lower batteries 50 in the present embodiment, projecting portions as described above may be provided in place of the down frames 9.

In the example of the drawing, since buffers 91b of the aforementioned falling sliders 91 are provided also on lower ends of the down frames 9, and the tandem grips 13a provided on both right and left edges of the riding sheet 13 are made of resin and function as buffers, impact applied to side portions of the batteries 50 from the road surface in overturning can be sufficiently relaxed.

That is, when the power plant 40 is arranged at the substantial center of the front and rear wheels 2, 3, and a plurality of the batteries 50 are arranged forward from above the power plant as in the present embodiment, an arrangement space of the batteries 50 is a triangle area connecting three points, specifically a direct upper position of the power plant 40, an upward diagonally forward position from the direct upper position closer to the head pipe 5, and a rearward position from the direct upper position closer to the upper end of the pivot frame 10 in side view of the vehicle body. A large triangle is configured on lateral surface of the batteries 50 such that the triangle area is covered by the projecting portions 91 on the upper portions of the down frames 9, the buffers 91b of the lower ends of the down frames 9, and the tandem grips 13a, thereby preventing collision of the batteries 50 and the road surface.

While the projecting portions 91 and the buffers 91b are provided on the upper portions and the lower ends of the down frames 9 respectively in the present embodiment, portions Where the projecting portions 91 or the buffers 91b are provided may be reduced as long as the projecting portions 91, and the buffers 91b can be replaced by other frame members. On the other hand, the number of the projecting portions 91 or the buffers 91b may be increased for more reliable protection of the batteries 50.

Figure 3:
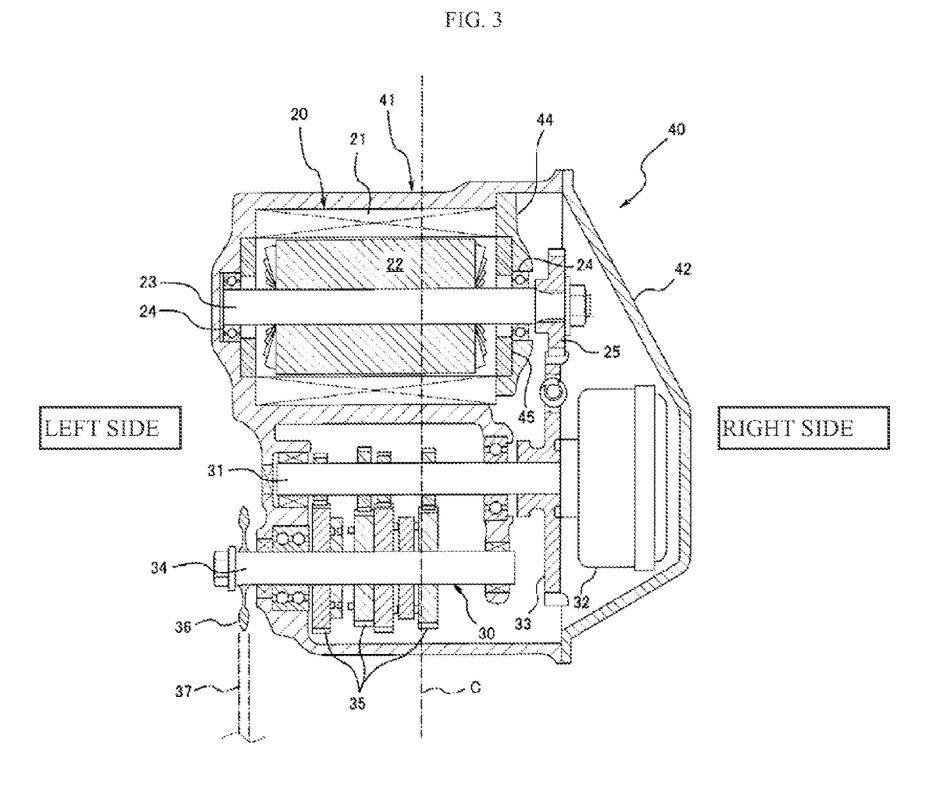
FIG. 3 is a development diagram showing a structure of a power plant of the electric two-wheeled vehicle.

FIG. 3 shows a structure of inside of the power plant 40. In this example, the case member of the power plant 40 is a schematically ellipsoidal bottomed cylindrical body in side view, and is configured from an outer case member 41 arranged such that the bottom is on a left side, and a cap 42 overlapping and fastened to close an opening on a right side opposite thereto. As shown in FIG. 1, an oil pan 43 with a narrowed bottom, swelling downward is provided on a lower portion of the outer case member 41, and stores an oil pump 46 therein (see FIG. 4).

The traveling motor 20 includes a stator 21 fixed to the outer case member 41, and a rotor 22 rotating with respect to the stator 21. In this example, the traveling motor 20 is configured from a so-called IPM motor, in which a permanent magnet is embedded in an iron core of the rotor 22. The stator 21 has a common structure, in which a plurality of magnet coils are wound around the iron core (stator core) of a magnetic steel sheet although not shown in detail, and specifically, is arranged to surround an outer peripheral side of the rotor 22, and having an outer periphery fixed to the outer case member 41.

On the other hand, a steel motor shaft 23 (motor shaft) penetrates the rotor 22, and has longitudinal both ends supported on the outer case member 41 by ball bearings 24. While the left ball bearings 24 are inserted in a circular concave 41a on the bottom of the outer ease member 41, the right ball bearings 24 are disposed on a separate bulkhead portion 44 fastened to the outer case member 41. The motor shaft 23 penetrates the bulkhead portion 44 and projects to right, and is disposed with an output gear 25 on a tip thereof.

Figure 4:
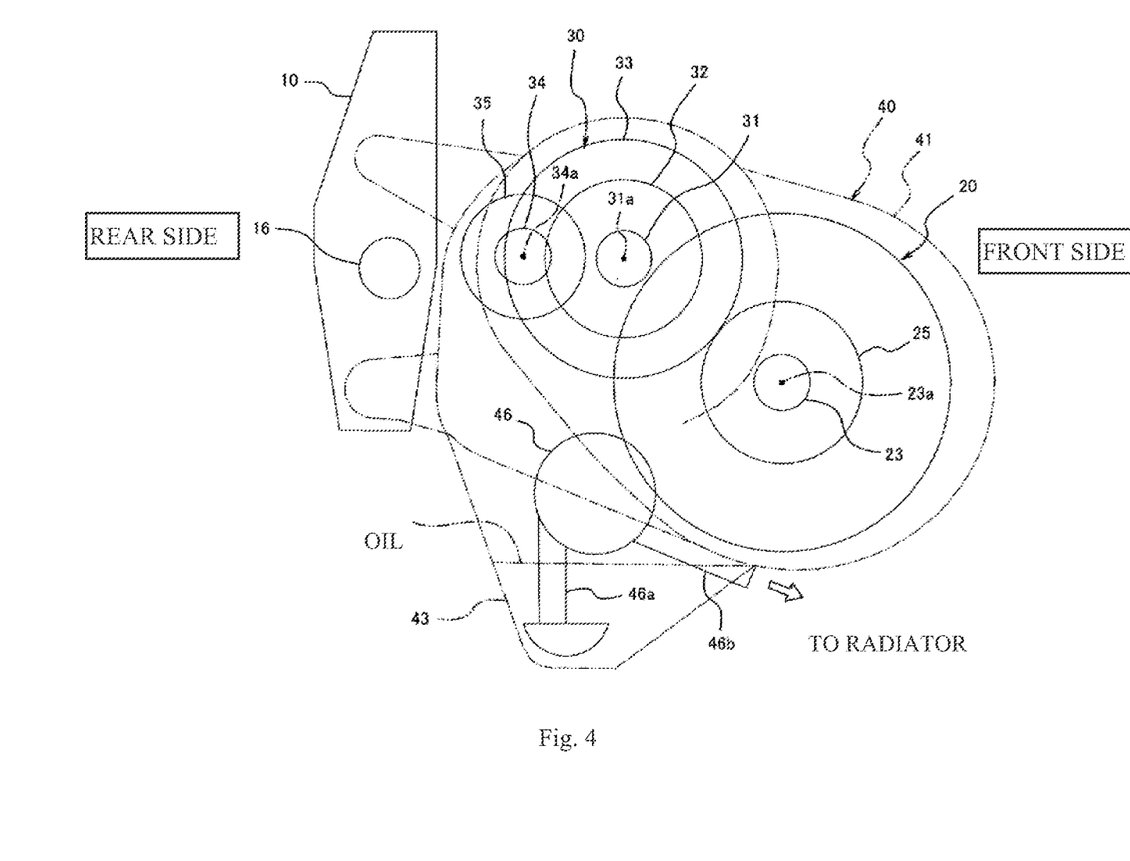
FIG. 4 is an explanatory diagram as viewing layout of main components of the power aslant in side view.

As schematically shown in FIG. 4, a clutch shaft 31 as an input shaft of the transmission 30 is disposed on a rear side of the traveling motor 20, and rotation output from the traveling motor 20 is switched to either input or shutoff by a multiple-disc clutch 32 disposed on a right end. That is, a clutch gear 33 is rotatably fitted onto a portion nearer a right end of the clutch shaft 31, meshes with the output gear 25 provided on the motor shaft 23, and the clutch shaft 31 rotates in conjunction with the motor shaft 23 when connected to the clutch shaft 31 by the multiple-disc clutch 32.

The output shaft 34 (output axis) of the transmission 30 is disposed parallel to the clutch shaft 31, and connected through gear trains 35 in such a manner as to freely change gears. A speed change ratio of input/output rotation, namely a gear position of the transmission 30 is changed by change of combination of gears connected in the gear trains 35 (changed to four-speed in the example of the drawing). A sprocket 36 is provided on a left end of the output shaft 34 outputting rotation thus changed in speed, and a chain 37 (endless transmission member: shown by a virtual line) is wounded between the sprocket of the rear wheel 3 and the sprocket 36.

A dashed line C shown in FIG. 3 is a center line of the rear wheel 3, namely a center line C of the vehicle body. The power plant 40 is installed such that the right and left weights are substantially balanced with a boundary of the vehicle body center line C therebetween. Specifically, while a gravity center of the traveling motor 20 is located on one side in the vehicle width direction with respect to the vehicle body center line C, the multiple-disc clutch 32 is located on the other side in the vehicle width direction, thereby setting the gravity center of the power plant 40 to approximate the vehicle body center.

Layout of Traveling Motor and Electric Storage Devices

Layout of the traveling motor 20 (power plant 40) and the batteries 50 in the electric two-wheeled vehicle 1 of the present embodiment will be described in detail with reference to FIG. 1 and FIG. 4. Generally, in vehicles having tilting vehicle bodies like two-wheeled vehicles, while handling is not easy when a gravity center position is high, light feeling during cornering becomes impaired when the gravity center position is too low. That is, since the two-wheeled vehicle tilts while cornering, an active cornering center line (roll axis line) of the vehicle body is not horizontal, and is defined to direct forward obliquely upward from a grounding point of the rear wheel. The further apart the gravity center position is from this roll axis line, the larger inertia moment during cornering of the vehicle body is.

In this regard, in the electric two-wheeled vehicle 1 of the present embodiment, the roll axis line is defined in an area between boundaries R1, R2 (shown by a dashed line) extending from a grounding point A of the rear wheel 3 to upper and lower ends of the head pipe 5, respectively, in side view of the vehicle body, and the gravity center Gb of the four batteries 50 is located in the roll axis area, as shown in FIG. 1. The gravity center Gp of the power plant 40 is located below the lower boundary R2 of the roll axis area, a composite gravity center Gt of the power plant 40 and the batteries 50 is located around the lower boundary of the roll axis area.

In the present embodiment, in the power plant 40, a shaft center 23a of the motor shaft 23 is located lower than shaft centers 31a, 34a of the clutch shaft 31 and the output shaft 34, in order to obtain such a preferable gravity center position, as schematically shown in FIG. 4. Thus, the traveling motor 20 is located as low as possible, the front part is made lower as the whole power plant 40, and an installation space of the batteries 50 can be secured diagonally forward from above the power plant.

That is, when driving force is transmitted from the sprocket 36 of the output shaft 34 to the rear wheel 3 by the chain 37, a height of the output shaft 34 is set to be substantially the same as or slightly higher than the pivot shaft 16, in order to properly maintain tension. Accordingly, when the shaft center 23a of the motor shaft 23 of the traveling motor 20 is lower than the shaft center 34a of the output shaft 34, an installation position of the traveling motor 20 in the vehicle body becomes low, and an arrangement space of the batteries 50 is easily secured above the traveling motor.

Since a position of the traveling motor 20 relatively forward in the power plant 40 is lowered, a front part becomes low as the whole power plant 40, and the batteries 50 are easily installed diagonally forward from above the power plant. Consequently, as shown in FIG. 1, a gravity center Gb of the batteries 50 is located diagonally forward above a gravity center Gp of the power plant 40, and the both are aligned such that front parts are high like the roll axis line. This gets an advantage in bringing both the gravity center Gb, Gp close to the roll axis line.

That is, it is possible to install the heavy batteries 50 as low as possible, set the composite gravity center Gt with the power plant 40 not too high, not to low, namely to be a proper height, and arrange such that the gravity centers Gp, Gb of the heavy power plant 40 and batteries 50 approximate the roll axis line.

Furthermore, in the present embodiment, the power plant 40 is supported adjacent to the front side of the pivot frame 10, the gravity center Gp thereof is located near the roll axis area, and the heaviest traveling motor 20 located relatively forward in this power plant 40 is located maximally on the rear side. This also allows the position of the gravity center Gp to approximate the roll axis line.

That is, the gear-type transmission 30 is employed as described above, thereby reducing an interval between the clutch shaft 31 and the output shaft 34 to obtain a compact configuration, positioning the clutch shaft 31 above a line segment connecting the shaft centers 23a, 34a of the motor shaft 23 and the output shaft 34, and reducing an interval between the clutch shaft 31 and the motor shaft 23 in forward and rearward direction.

Moreover, the clutch shaft 31 is arranged maximally closer to the motor shaft 23, a driven gear 33 on the clutch shaft 31 meshing with a drive gear 25 on the motor shaft 23 partially overlaps the traveling motor 20 in side view of the vehicle body as shown in FIG. 4. Thus, the whole power plant 40 reduces in size in forward and rearward direction by maximally reducing the interval between the traveling motor 20 and the transmission 30 in forward and rearward direction, and the heavy traveling motor 20 is located as rear as possible.

As shown in FIG. 4, the oil pan 43 on a lower portion of the power plant 40 stores the oil pump 46 for supplying oil to the gear trains 35 and the like of the transmission 30. The oil pump 46 is driven for example by the electric motor, and pumps oil accumulated in the oil pan 43 by a strainer 46a to discharge the same. In the example of the drawing, a discharge portion 46b penetrates the outer case member 41, and is connected to a radiator 70 by a hose 71 (see FIG. 1).

As described above, the electric two-wheeled vehicle 1 according to the present embodiment, the power plant 40 configured from the traveling motor 20 and the transmission 30 is installed around the center of the vehicle body in forward and rearward direction as low as possible in the state where a front part is at a lower position, and the batteries 50 are installed diagonally forward from above the power plant, and hence the individual gravity center positions Gp, Gb can approximate the roll axis line where a front part is high while the height of the composite gravity center Gt of the heavy power plant 40 and batteries 50 is properly set. Accordingly, balance of handling and motion performance of the vehicle can be improved.

In this embodiment, the power plant 40 is supported adjacent to the front side of the pivot frame 10, and downsized particularly in forward and rearward direction, thereby allowing the traveling motor 20 located relatively forward to approximate the rearward pivot frame 10. This also allows the gravity center Gp of the power plant 40 to approximate the roll axis line.

—Modification—

Figure 5:
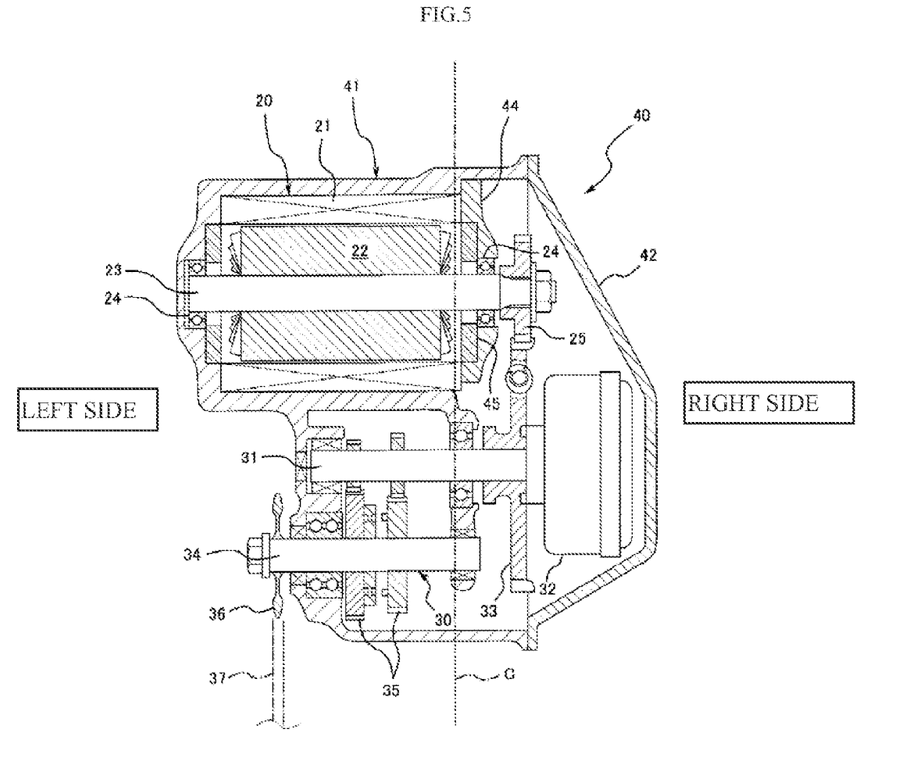
FIG. 5 is a diagram corresponding to FIG. 3 according to a modification of a simplified transmission.

FIG. 5 shows a modification of a structure of a simplified transmission. In a transmission 130 of this modification, the number of gears of gear trains 135 is smaller than that of the gear trains 135 of the aforementioned embodiment, for example, the gear trains 135 change to two-speed. Thus, it is possible to shorten a length of a clutch shaft 31 or an output shaft 34 by the number of reduced gears, and reduce size and a weight of a power plant 140. However, since a position of a sprocket 36 is determined corresponding to a position of a sprocket of a rear wheel 3, a left side with respect to a center line C (shown by a dashed line) of a rear wheel 3, namely a vehicle body becomes heavier as shown in the drawing. In order to deal with the above, for example, batteries 50 may be asymmetrically arranged such that a right side is heavier, or a gravity center of a traveling motor 20 may be arranged on the right side of the vehicle center line C, although not shown in the drawing.

While the transmission 30, or 130 is interposed before rotation of the motor shaft 23 is transmitted to the output shaft 34 of the power plant 40, and a speed reduction ratio is changeable in a plurality of stages in the present embodiment including the aforementioned modification, the present invention is not limited to this. The transmission 30, or 130 may not be provided, and the rotation of the motor shaft 23 may be transmitted to the output shaft 34 at a constant speed reduction ratio.

Second Embodiment

Figure 6:
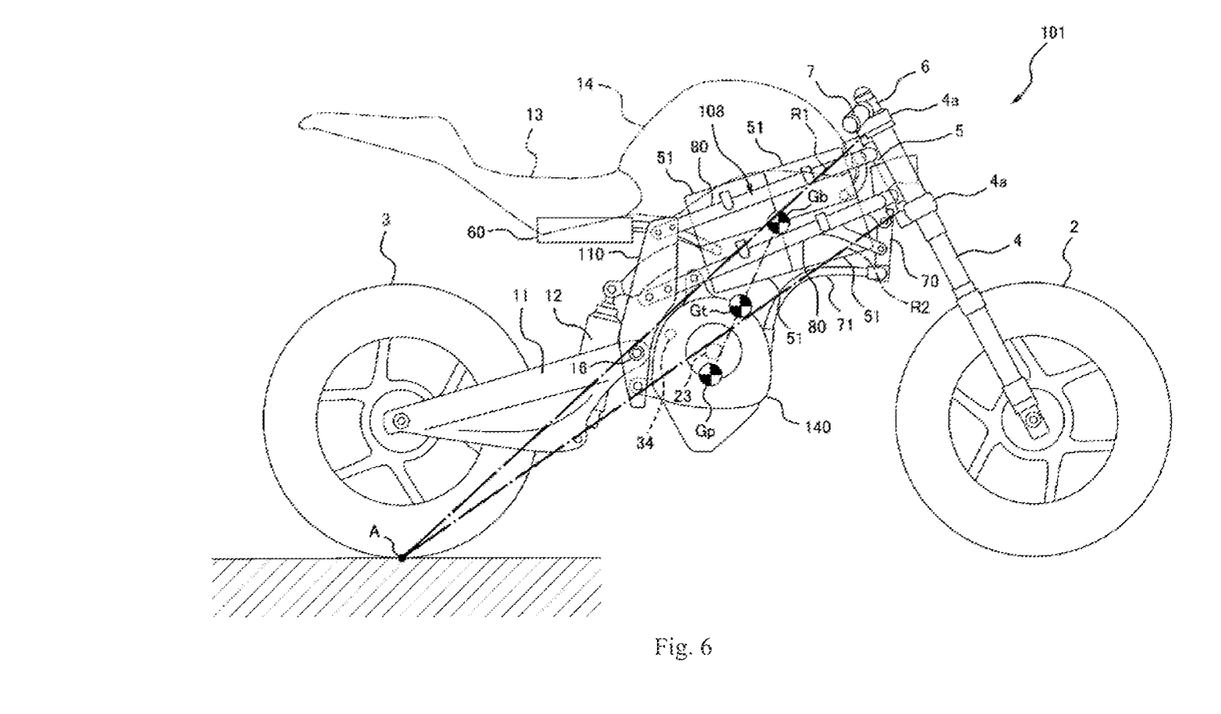
FIG. 6 is a diagram corresponding to FIG. 1 according to a second embodiment.
Figure 7:
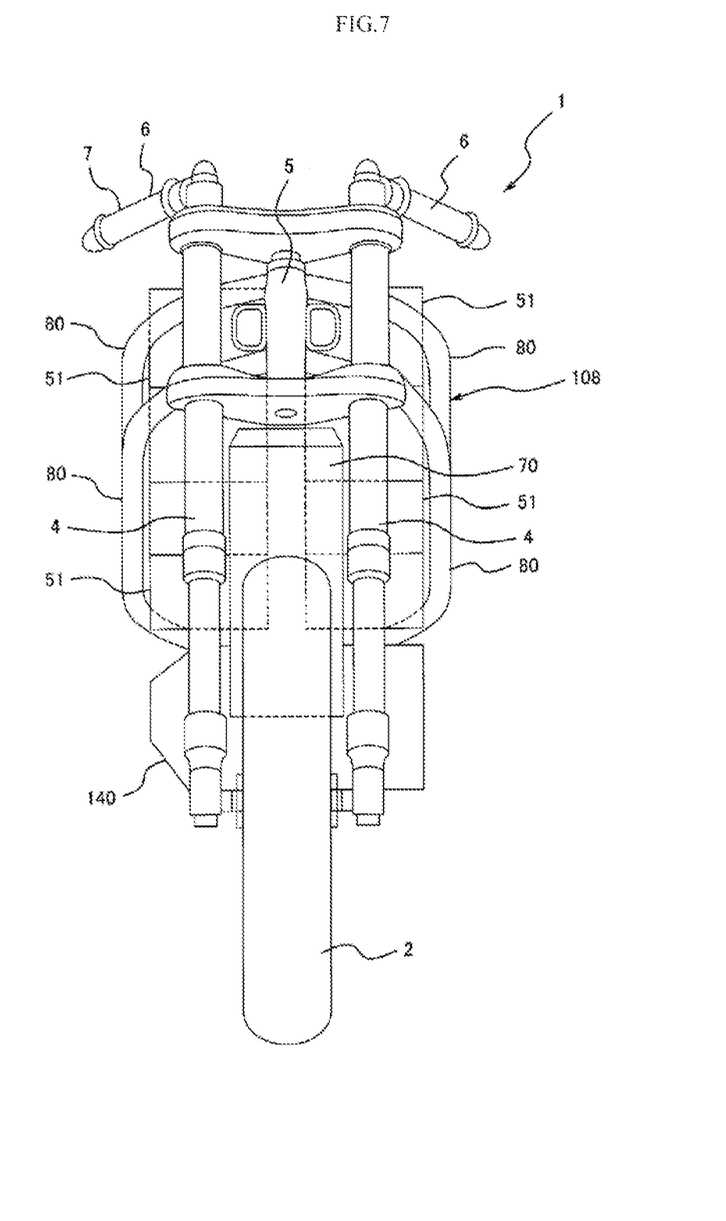
FIG. 7 is a diagram corresponding to FIG. 2 according to the second embodiment.

FIGS. 6 and 7 each show an electric two-wheeled vehicle 101 according to a second embodiment of the present invention. Both figures correspond to FIGS. 1 and 2 of the aforementioned first embodiment. The electric two-wheeled vehicle 101 of the second embodiment is different in structures of a body frame and a power plant from the first embodiment, and a way to install batteries 51 (electric storage devices) is different in conjunction with this. Hereinafter, different portions thereof will be described, the same reference numerals denote the same members, and description thereof will be omitted.

In the present embodiment, the body frame does not includes the down frames 9 like the aforementioned first embodiment, a main frame 108 is forked into right and left from a head pipe 5, and right and left frame members are configured by a pair of upper and lower pipe members 80, as shown in FIG. 7. Consequently, bending rigidity or torsional rigidity of the body frame can be easily secured.

In the present embodiment, a power plant 140 includes no transmission, and reduces speed of rotation of a traveling motor 20 by a gear pair to output the same from an output shaft 34. Therefore, the power plant 140 is more downsized than that of the first embodiment, and supported adjacent to a front side of a pivot frame 110. Batteries 51 installed diagonally forward from above the power plant 140 are slightly smaller than those of the first embodiment, and the four batteries on each right and left side, a total of eight batteries are installed. Since the right and left pipe members 80 of the main frame 108 surround the batteries 51 as shown in FIG. 7, impact from a road surface is unlikely to be applied even when the electric two-wheeled vehicle 101 overturns.

As shown by a broken line in FIG. 6, also in this second embodiment, a motor shaft 23 of the traveling motor 20 is located lower than the output shaft 34 in the power plant 140, While a gravity center Gp of the power plant 140 is located below a lower boundary R2 of a roll axis area, a gravity center Gb of the batteries 51 is located in the roll axis area, and a composite gravity center Gt thereof is located on a relatively lower side in the roll axis area.

Similarly to the aforementioned first embodiment, the gravity center Gp of the power plant 140 located at a relatively low position is relatively posteriorly located, the gravity center Gb of the batteries 50 located at a relatively high position is relatively anteriorly located, and both the gravity centers Gp, Gb of the power plant 140 and the batteries 51 are aligned in a state where a front part is at a higher position similarly to the roll axis line.

Therefore, also in the electric two-wheeled vehicle 101 according to the present embodiment, the positions of the respective gravity centers Gp, Gb can approximate the roll axis line while the composite gravity center Gt of the power plant 140 and the batteries 51 are properly set, and handling and motion performance of the electric two-wheeled vehicle 1 are improved.

Other Embodiment

Description of the aforementioned first and second embodiments is merely exemplification, and does not limit the present invention, or application or use thereof. For example, while the batteries 50 as the electric storage devices are installed such that the two batteries are arranged on each right and left side in the first embodiment, and the batteries 51 are installed such that the four batteries are arranged on each right and left side in the second embodiment, the numbers of the batteries 50, 51 on the right and left sides may not be the same.

When the plurality of batteries 50, 51 are installed in such a manner, the respective gravity center positions of the batteries 50, 51 are preferably close to the roll axis line, and more preferably aligned along the roll axis line. Alternatively, when the batteries are formed in a longitudinal shape as a whole, a longitudinal direction thereof is preferably disposed along the roll axis line. As electric storage devices, capacitors or the like may be used other than the batteries 50, 51, for example.

While the power plant 40 includes the gear-type transmission 30 in the first embodiment, a belt-type transmission such as a CVT may be employed. While the rotation of the output shaft 34 is transmitted to the rear wheel 3 by the chain 37 in each of the first and second embodiments, the chain may be replaced by a belt or a drive shaft.

Furthermore, while the electric two-wheeled vehicles 1, 101 have been described in the respective embodiments, the electric vehicle according to the present invention is not limited to the two-wheeled vehicle, may be, for example, an ATV (All Terrain Vehicle), a mechanical mule, or the like. However, vehicles having vehicle bodies tilting during cornering, including three-wheeled vehicles, and four-wheeled vehicles are particularly suitable.

INDUSTRIAL APPLICABILITY

As described above, in the saddle-type electric vehicle according to the present invention, the gravity center positions of the heavy power plant and electric storage devices are properly set, and motion performance can be enhanced while handling is easy, and hence the present invention is particularly useful to electric two-wheeled vehicles.

DESCRIPTION OF REFERENCE SIGNS

ELECTRIC TWO-WHEELED VEHICLE (ELECTRIC VEHICLE)
FRONT WHEEL
REAR WHEEL
HEAD PIPE
8, 108 MAIN FRAME (MAIN FRAME PORTION)
80 PIPE MEMBERS (FRAME MEMBERS)
9 DOWN FRAME (DOWN FRAME PORTION)
91. FAILING SLIDERS (PROJECTING PORTIONS)
10, 110 PIVOT FRAME (PIVOT SUPPORT PORTION OF BODY FRAME)
11 SWING ARM
16 PIVOT SHAFT
20 TRAVELING MOTOR (ELECTRIC MOTOR)
23 MOTOR SHAFT (MOTOR SHAFT)
23a SHAFT CENTER OF MOTOR SHAFT
25 DRIVE GEAR ON MOTOR SHAFT
30, 130 TRANSMISSION (POWER TRANSMISSION MECHANISM)
31 CLUTCH SHAFT (INPUT SHAFT)
33 DRIVEN GEAR ON INPUT SHAFT
34 OUTPUT SHAFT (OUTPUT AXIS)
34a SHAFT CENTER OF OUTPUT SHAFT
35, 135 GEAR TRAIN
36 SPROCKET
37 CHAIN (ENDLESS TRANSMISSION MEMBER)
40, 140 POWER PLANT
50, 51 BATTERY (ELECTRIC STORAGE DEVICE)
Gb GRAVITY CENTER OF BATTERY
Gp GRAVITY CENTER OF POWER PLANT
Gt COMPOSITE GRAVITY CENTER OF BOTH
R1, R2 BOUNDARY OF ROLL AXIS AREA

The invention claimed is:

1. A saddle-type electric vehicle, comprising:
a front wheel and a rear wheel;
a swing arm supporting the rear wheel;
a body frame including a pivot frame which pivotally supports a front end of the swing arm by a pivot shaft;
a traveling electric motor installed between the front wheel and the rear wheel, and driving the rear wheel;
a power transmission mechanism comprising an output shaft receiving rotation transmitted from a motor shaft of the electric motor;
an endless transmission member wound around the output shaft, extending rearward, and transmitting the rotation of the output shaft to the rear wheel;
electric storage devices storing power supplied to the electric motor; and
an oil pan provided on a lower portion of a power plant configured from the electric motor and the power transmission mechanism,
wherein the output shaft is arranged more rearward of a vehicle body than the motor shaft, more forward than the pivot frame, as high or slightly higher than the pivot shaft, and parallel to the motor shaft,
a shaft center of the motor shaft is located at a lower position than a shaft center of the output shaft, and
the electric motor is disposed lower than the power transmission mechanism, and the electric storage devices are disposed above and close to the electric motor.

2. The saddle-type electric vehicle according to claim 1, wherein the vehicle body is configured to tilt inside during cornering, and
a gravity center of the electric storage devices is located at a position more forward of the vehicle body than and higher than a gravity center of the power plant.

3. The saddle-type electric vehicle according to claim 2, wherein the body frame includes a head pipe supporting a steering shaft, and
while the gravity center of the electric storage device is in a roll axis area between boundaries connecting a grounding point of the rear wheel to upper and lower ends of the head pipe, respectively, in a side view of the vehicle body,
the gravity center of the power plant is below a lower boundary of the roll axis area.

4. The saddle-type electric vehicle according to claim 3, wherein the power plant is supported adjacent to a front side of the pivot frame.

5. The saddle-type electric vehicle according to claim 4, wherein the power transmission mechanism comprises an input shaft arranged more rearward of the vehicle body than the motor shaft of the electric motor, more forward of the vehicle body than the output shaft, and parallel to both shafts, and receiving rotation transmitted from the motor shaft, and
the power transmission mechanism is a gear-type transmission changing speed of the rotation from the motor shaft transmitted to the input shaft by gear trains provided on the input shaft and the output shaft respectively, and transmitting the rotation to the output shaft.

6. The saddle-type electric vehicle according to claim 5, wherein a driven gear meshing with a drive gear on the motor shaft is provided on the input shaft, and the driven gear is arranged to partially overlap the electric motor in a side view of the vehicle body.

7. The saddle-type electric vehicle according to claim 6, wherein the driven gear is disposed such that the driven gear partially overlaps with the electric motor and the output shaft in side view of the vehicle body.

8. The saddle-type electric vehicle according to claim 1, wherein the body frame includes a head pipe supporting a steering shaft, a main frame portion extending rearward from the head pipe, and a pair of right and left down frame portions extending downward from a front end of the main frame portion, and
at least lower parts of the right and left down frame portions are located outside electric storage devices in a vehicle width direction in a front view of the vehicle body.

9. The saddle-type electric vehicle according to claim 8, wherein respective projecting portions are provided on upper parts of the right and left down frame portions to project outside the electric storage devices in the vehicle width direction.

10. The saddle-type electric vehicle according to claim 1, wherein the body frame includes a head pipe supporting a steering shaft, and a main frame portion extending rearward from the head pipe, and the main frame portion is configured from a frame member divided into right and left parts to surround a group of electric storage devices.

11. The saddle-type electric vehicle according to claim 1, wherein the power transmission mechanism includes a drive gear provided on the motor shaft, the drive gear is disposed at one side in an axial direction, and the endless transmission member is wound around the output shaft on the other side in the axial direction.

12. The saddle-type electric vehicle according to claim 1, comprising an oil pump stored in the oil pan,
wherein the power transmission mechanism includes a drive gear provided on the motor shaft, and an input shaft which receives the rotation transmitted from the drive gear and transmits the rotation to the output shaft, and
the input shaft is located above a line segment connecting shaft centers of the motor shaft and the output shaft.

13. The saddle-type electric vehicle according to claim 1, wherein a front part of the power plant is disposed at a lower position, and the electric storage devices are disposed above the front part of the power plant.

14. A saddle-type electric vehicle, comprising:
a front wheel and a rear wheel;
a swing arm supporting the rear wheel;
a body frame including a pivot frame which pivotally supports a front end of the swing arm by a pivot shaft;
a traveling electric motor installed between the front wheel and the rear wheel, and driving the rear wheel;
a power transmission mechanism comprising an output shaft receiving rotation transmitted from a motor shaft of the electric motor;
an endless transmission member wound around the output shaft, extending rearward, and transmitting the rotation of the output shaft to the rear wheel;
electric storage devices storing power supplied to the electric motor; and
a clutch which switches the rotation output from the motor shaft to input or shutoff,
wherein the power transmission mechanism includes a drive gear which is provided on the motor shaft, an input shaft which receives the rotation transmitted from the drive gear, and a gear which reduces a speed of the rotation of the input shaft and transmits the rotation with a reduced speed to the output shaft, and
a gravity center of the electric motor is located on one side in a vehicle width direction with respect to a vehicle body center line, the clutch is located on the other side in the vehicle width direction with respect to the vehicle body center line, the clutch is provided on the input shaft, and the electric motor is disposed below and more forward than the clutch.

15. A saddle-type electric vehicle comprising:
a front wheel and a rear wheel;
a swing arm supporting the rear wheel;
a body frame including a pivot frame which pivotally supports a front end of the swing arm by a pivot shaft;
a traveling electric motor installed between the front wheel and the rear wheel, and driving the rear wheel;
a power transmission mechanism comprising an output shaft receiving rotation transmitted from a motor shaft of the electric motor;
an endless transmission member wound around the output shaft, extending rearward, and transmitting the rotation of the output shaft to the rear wheel; and
electric storage devices storing power supplied to the electric motor,
wherein the endless transmission member is located on a left side of a vehicle body center line, and a gravity center of the electric motor is located on a right side of the vehicle body center line.

16. A saddle-type electric vehicle, comprising:
a front wheel and a rear wheel;
a swing arm supporting the rear wheel;
a body frame including a pivot frame which pivotally supports a front end of the swing arm by a pivot shaft;
a traveling electric motor installed between the front wheel and the rear wheel, and driving the rear wheel;
a power transmission mechanism comprising an output shaft receiving rotation transmitted from a motor shaft of the electric motor;
an endless transmission member wound around the output shaft, extending rearward, and transmitting the rotation of the output shaft to the rear wheel; and
electric storage devices storing power supplied to the electric motor,
wherein the vehicle body is configured to tilt inside during cornering,
a gravity center of the electric storage devices is located at a position more forward of the vehicle body than and higher than a gravity center of a power plant configured from the electric motor and the power transmission mechanism,
the body frame includes a head pipe supporting a steering shaft,
while the gravity center of the electric storage device is in a roll axis area between boundaries connecting a grounding point of the rear wheel to upper and lower ends of the head pipe, respectively, in a side view of the vehicle body, the gravity center of the power plant is below the lower boundary of the roll axis area, and
a composite gravity center of the power plant and the electric storage devices is located in the roll axis area.

* * * * *